United States Patent [19]

Claycomb

[11] E Re. 30,055

[45] Reissued Jul. 24, 1979

[54] APPARATUS FOR TRANSMITTING WELL BORE DATA

[75] Inventor: Jackson R. Claycomb, Houston, Tex.

[73] Assignee: Schlumberger Technology Corporation, New York, N.Y.

[21] Appl. No.: 893,569

[22] Filed: Apr. 5, 1978

Related U.S. Patent Documents

Reissue of:

[64] Patent No.: 3,949,354
Issued: Apr. 6, 1976
Appl. No.: 470,081
Filed: May 15, 1974

[51] Int. Cl.[2] ..... G01V 1/40

[52] U.S. Cl. ..... 340/18 LD; 340/18 NC

[58] Field of Search ..... 340/18 NC, 18 LD

[56] References Cited

U.S. PATENT DOCUMENTS

| | | | |
|---|---|---|---|
| 2,958,821 | 11/1960 | Webb | 340/18 LD |
| 3,770,006 | 11/1973 | Sexton et al. | 340/18 NC |
| 3,792,429 | 2/1974 | Patton et al. | 340/18 NC |
| 3,863,203 | 1/1975 | Patton et al. | 340/18 LD |

*Primary Examiner*—S. C. Buczinski
*Attorney, Agent, or Firm*—David L. Moseley; William R. Sherman; Thomas Langer

[57] ABSTRACT

In the representative embodiments of the present invention described herein, a drilling mud is circulated through a drill string at a sufficient rate to effectively operate an impeller-driven electrical generator arranged on a tool coupled in the drill string for supplying power to downhole electrical circuits and one or more downhole condition-measuring devices on the tool. By selectively controlling the flow of drilling mud past the impeller in accordance with the conditions being monitored by the condition-measuring devices, data-encoded acoustic signals are produced in the circulating fluid and transmitted to the surface for detecting and decoding as power is simultaneously supplied to the downhole system by the generator.

38 Claims, 16 Drawing Figures

FIG.1
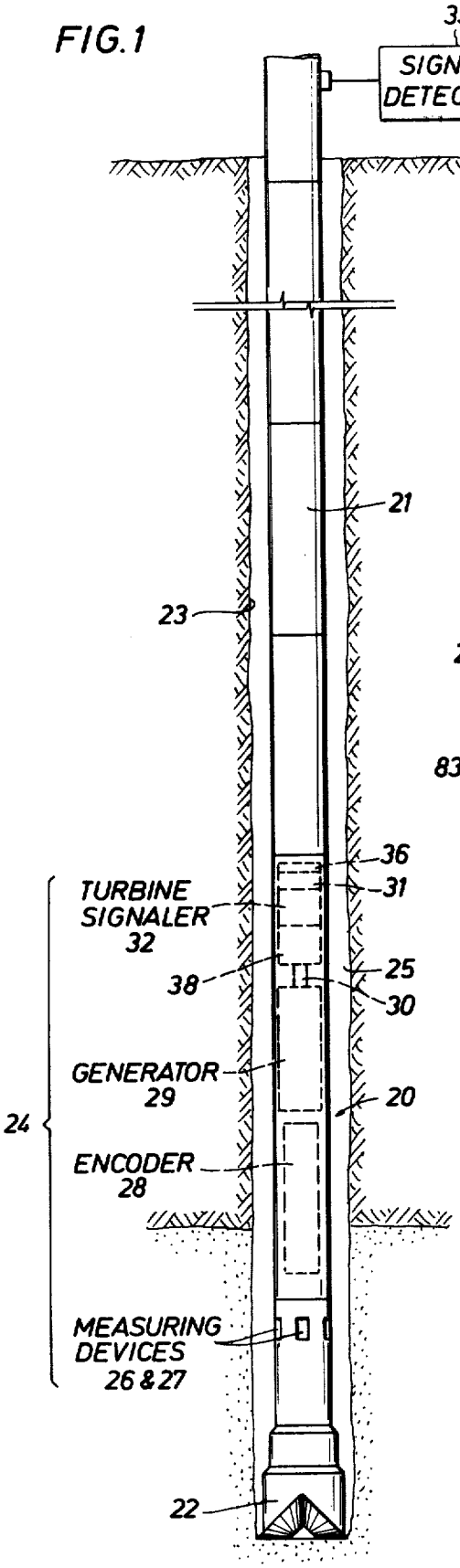
FIG.3A
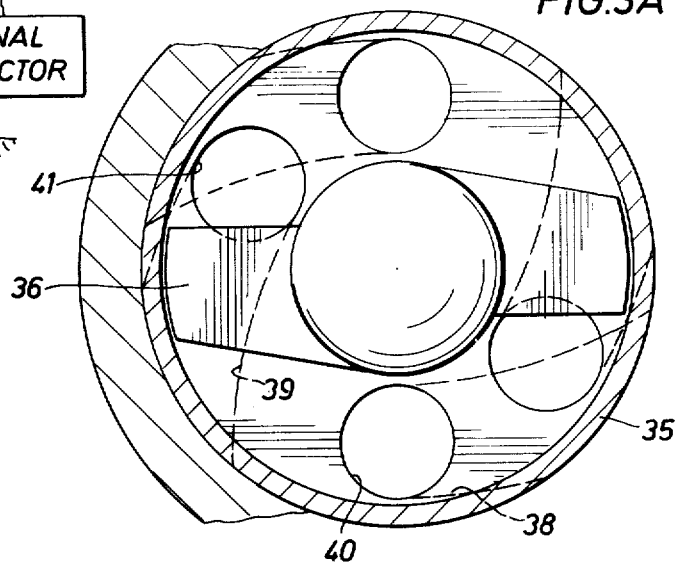
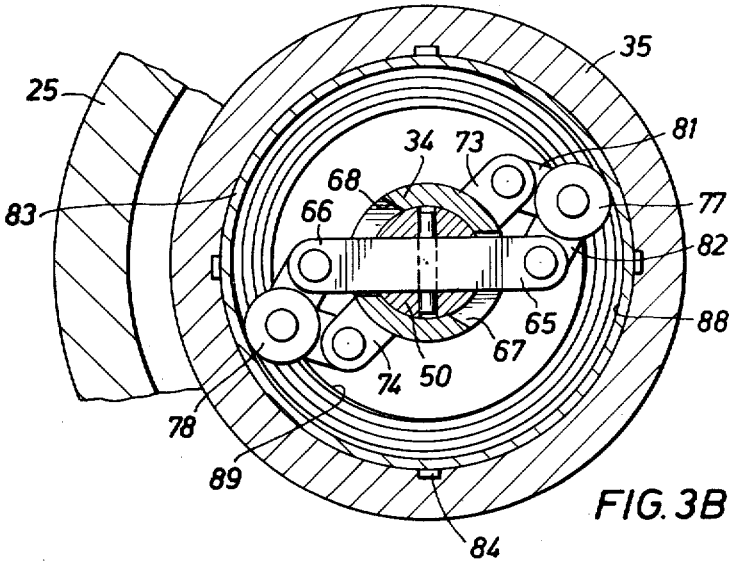
FIG.3B
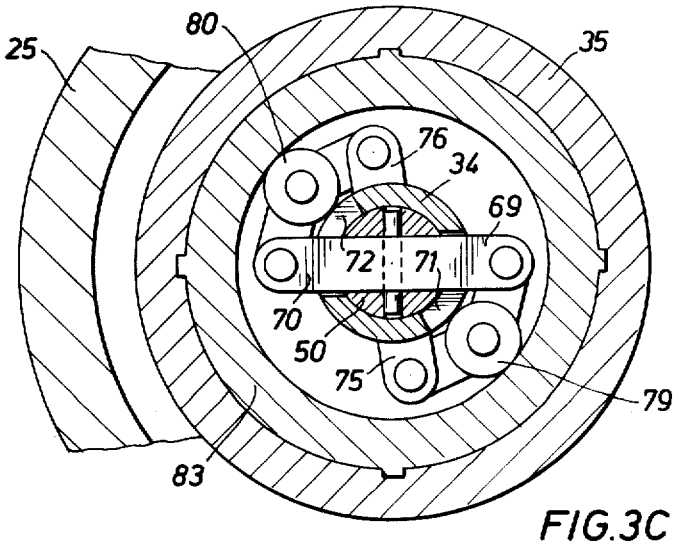
FIG.3C

FIG. 5A
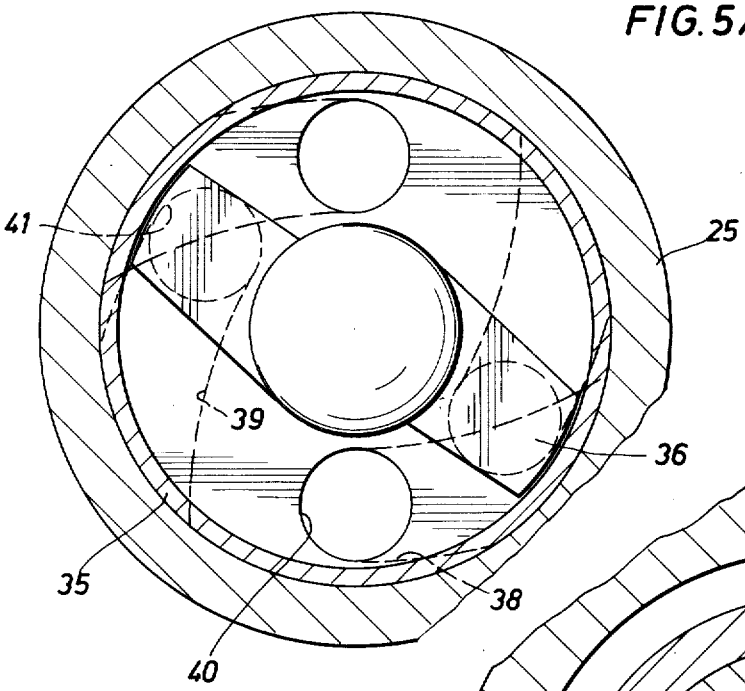
FIG. 5B
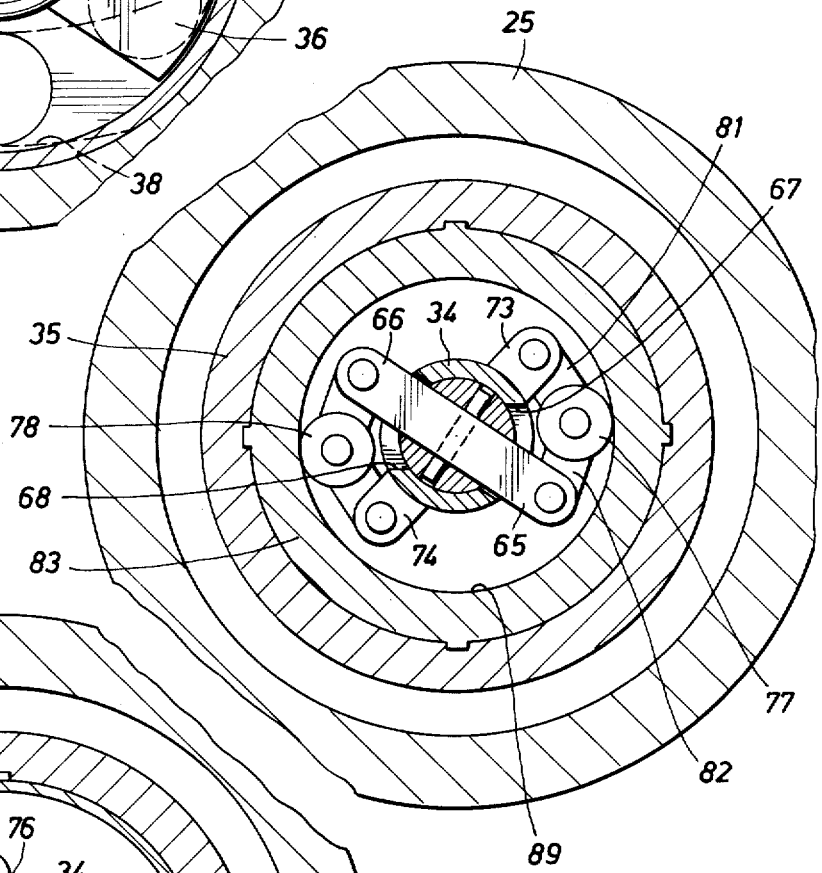
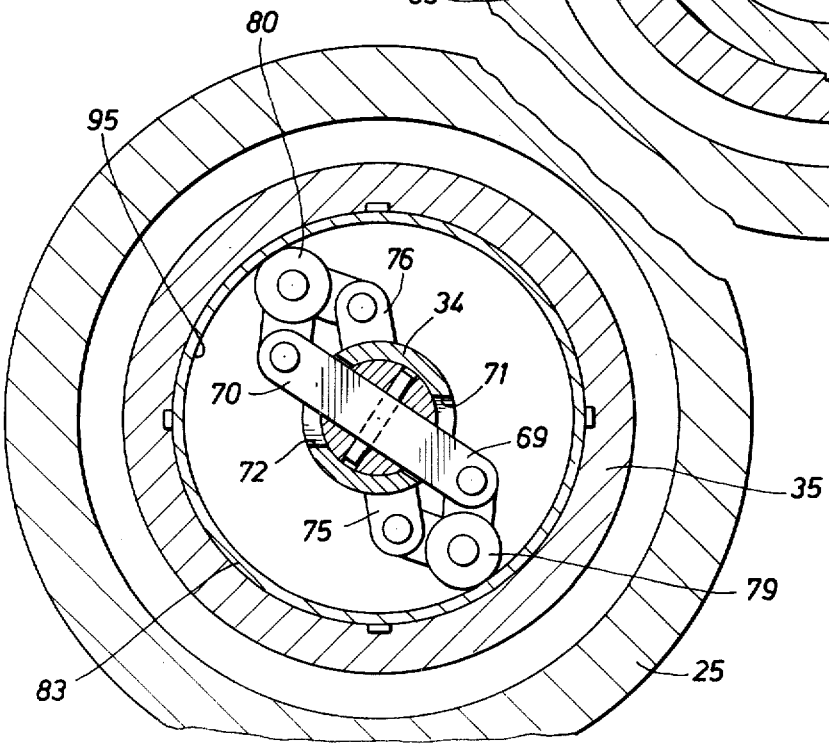
FIG. 5C

FIG. 8
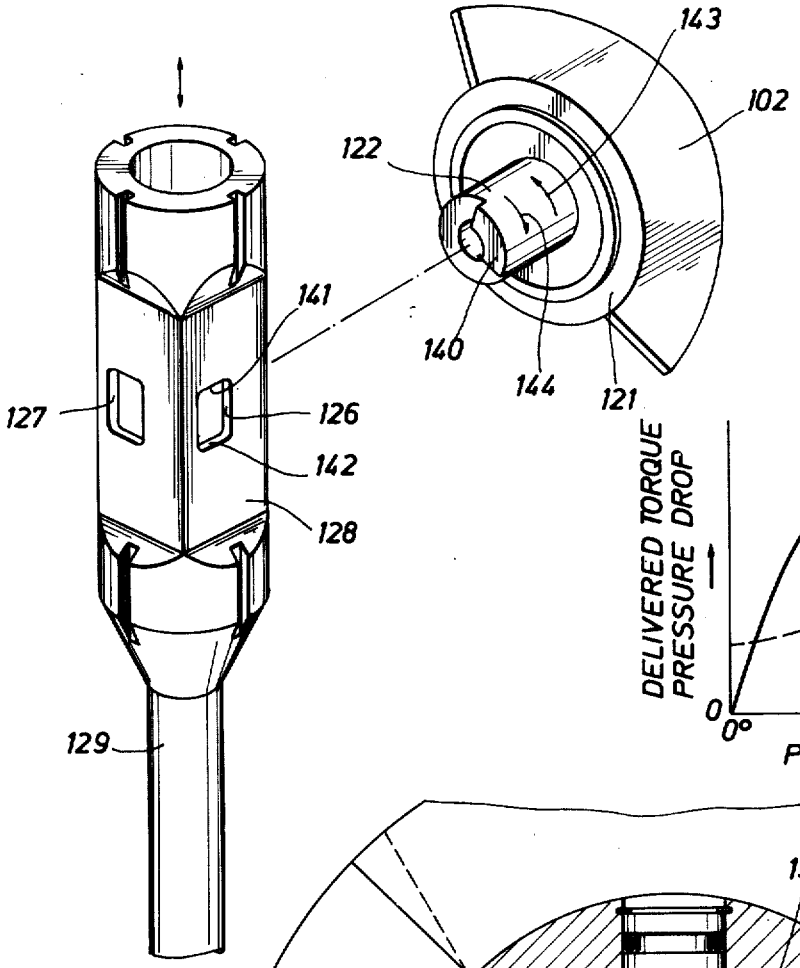
FIG. 10
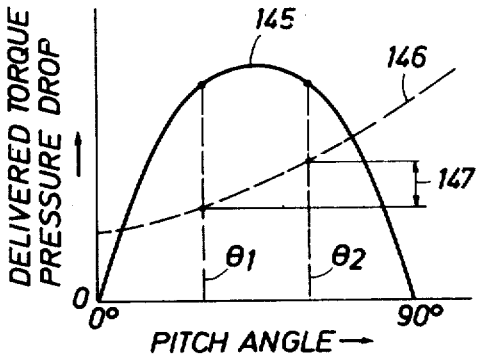
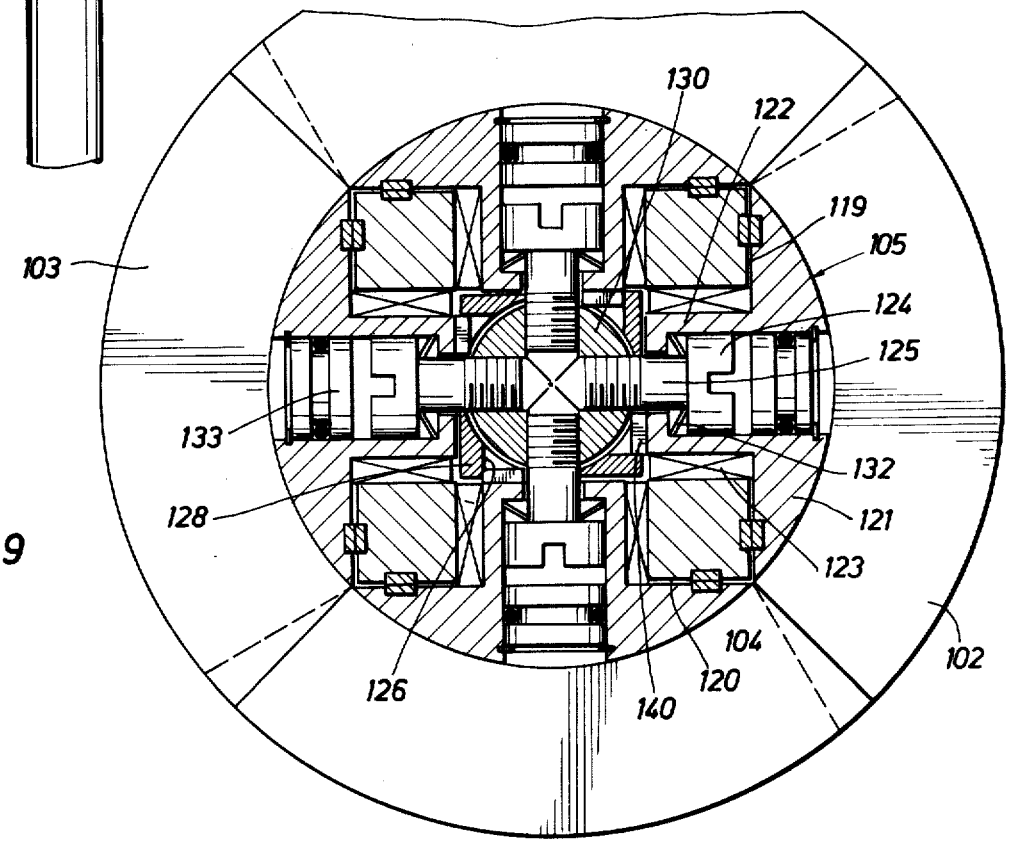
FIG. 9

APPARATUS FOR TRANSMITTING WELL BORE DATA

Matter enclosed in heavy brackets [ ] appears in the original patent but forms no part of this reissue specification; matter printed in italics indicates the additions made by reissue.

Many systems have been proposed heretofore for transmitting data representative of one or more measured downhole conditions to the surface during the drilling of a borehole. In recent years, however, it has become apparent that from the standpoint of potential commercial utility, the most-promising data-transmission system of this nature will employ the drilling mud circulating through the drill string as a medium for transmitting encoded acoustic signals to the surface.

Typical of these proposals is the new and improved downhole signaling tool described in U.S. Pat. No. 3,736,558 which includes a selectively-controlled valve that is operated for momentarily interrupting the flow of drilling mud through the drill string so as to produce sucessive data-encoded acoustic pulses in the mud stream which can be readily detected at the surface. Alternatively, other promising data-transmission systems of this nature employ a similar-downhole signaling tool such as those described in U.S. Pat. No. 3,309,565 and U.S. Pat. No. 3,764,970 in which a motor-driven "siren signaler" is operated to transmit either frequency-modulated or phase-encoded data signals at acoustic frequencies to the surface by way of the mud stream in the drill string. In either of these "siren-signaling" systems, it has been found best to power the various downhole electrical components by a typical self-contained turbine-generator unit which is steadily driven by the mud stream flowing through the drill string.

As may be expected, there are, of course, countervailing advantages and disadvantages between these two different types of downhole data-transmission system. For instance, although the aforementioned "pressure-pulse" signaling tools require a minimum of electrical power and produce a stronger signal than the "siren-signaling" tools, it has been found that the pressure-pulse signals sometimes have an unfavorable signal-to-noise ratio in comparison to the siren signals. On the other hand, since these signalers are driven by a suitable electrical motor, these tools require significantly more electrical power than the pressure-pulse tools. Thus, with the siren-signaling tools which have been proposed to date, it has been found that a larger turbine-generator unit is required and higher mud flow rates must be supplied than is the case with an otherwise-equivalent pressure-pulse signaling tool.

Accordingly, it is an object of the present invention to provide new and improved apparatus to reliably produce coded acoustic signals in a circulating well fluid, such as drilling mud, for rapidly and accurately conveying data representative of one or more downhole conditions to the surface but with minimum electrical power requirements for the downhole components of the transmission system.

This and other objects of the present invention are broadly attained by selectively controlling the flow of a circulating well fluid past a fluid-driven generator unit arranged in a pipe string carrying the flowing fluid so as to produce encoded acoustic signals in the fluid which are representative of downhole conditions as monitored by one or more measuring devices which are powered by the downhole generator. In a preferred embodiment of new and improved apparatus arranged in accordance with the principles of the present invention, a generator is driven by an otherwise typical turbine-type impeller which is cooperatively associated with selectively-operable flow-obstructing means adapted for movement between one position where little or no obstruction is presented to the fluid flowing through the ports of the turbine impeller and another position where this flow is at least momentarily retarded for producing an acoustic signal in the flowing fluid. An alternative embodiment of new and improved apparatus of the present invention employs a generator which is driven by an impeller with variably-positionable blades. Means are provided for selectively shifting the impeller blades between a minimum flow-obstruction position and an increased flow-obstruction position and an increased flow-obstruction position for producing an acoustic signal in the flowing fluid. Both embodiments of the new and improved apparatus of the present invention further include means for selectively operating the apparatus for momentarily obstructing the flowing fluid to transmit data-encoded acoustic signals through the fluid stream which are representative of one or more downhole conditions.

The novel features of the present invention are set forth with particularity in the appended claims. The invention, together with further objects and advantages thereof, may be best understood by way of the following description of exemplary apparatus employing the principles of the invention as illustrated in the accompanying drawings, in which:

FIG. 1 shows a new and improved well tool arranged in accordance with the present invention as it will appear while coupled in a drill string during the course of a typical drilling operation;

FIGS. 3A-3C are cross-sectional views respectively taken along the lines "3A—3A", "3B—3B" and "3C—3C" in FIGS. 2A and 2B;

FIGS. 5A-5C are cross-sectional views similar to FIGS. 3A-3C but which are respectively taken along the lines "5A—5A", "5B—5B" and "5C—5C" in FIGS. 4A and 4B to illustrate the operation of the acoustic signaler shown in FIGS. 2A and 2B;

FIG. 8 is an isometric view of one of the significant features of the new and improved signaler shown in FIGS. 6 and 7;

FIG. 9 is a cross-sectional view taken along the lines "9—9" in FIG. 7 to illustrate additional features of that alternative embodiment of the apparatus of the present invention; and FIG. 10 graphically represents the operating characteristics of the signaler shown in FIGS. 6–9.

Figure 2A:
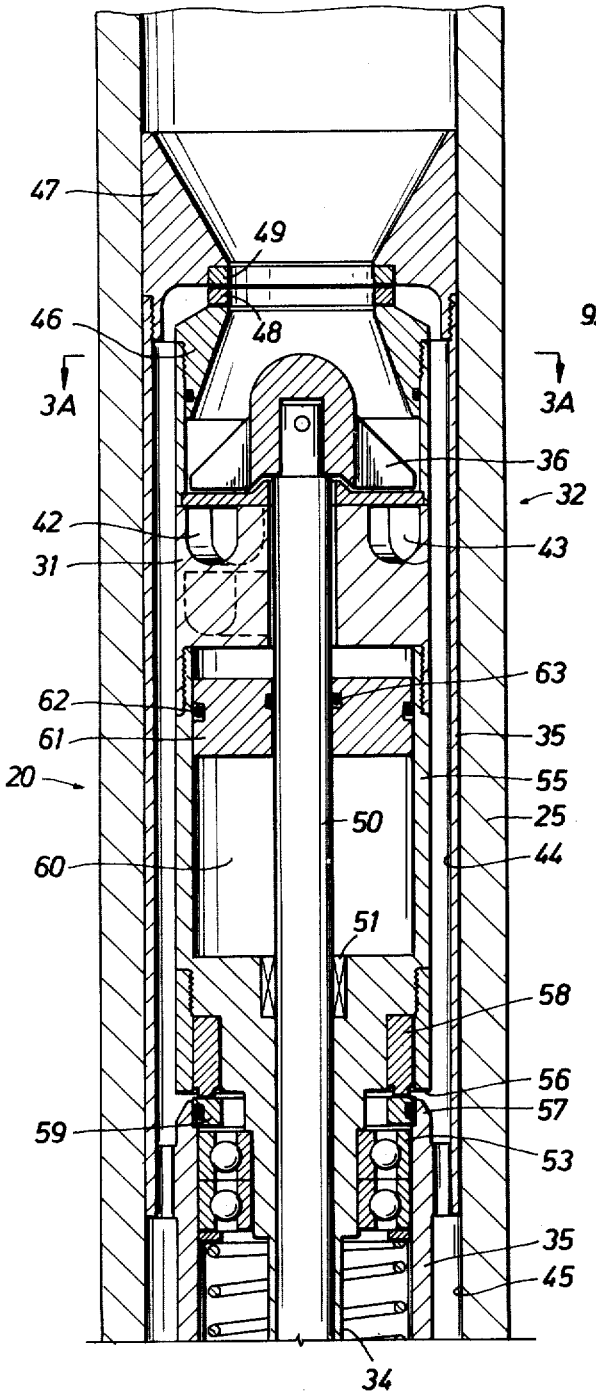
FIGS. 2A and 2B are successive enlarged cross-sectioned views of a preferred embodiment of a selectively-operable acoustic signaler employed with the well tool shown in FIG. 1 to produce data-coded acoustic signals.

Turning now to FIG. 1, a new and improved well tool 20 arranged in accordance with the present invention is depicted coupled in a typical drill string 21 having a rotary drill bit 22 dependently coupled thereto and adapted for excavating a borehole 23 through various earth formations. As the drill string 21 is rotated by a typical drilling rig (not shown) at the surface, substantial volumes of a suitable drilling fluid or so-called "mud" are continuously pumped downwardly through the tubular drill string and discharged from the drill bit 22 to cool the bit as well as to carry earth borings removed by the bit to the surface as the mud is returned upwardly along the borehole 23 exterior of the drill string. It will be appreciated, therefore, that the circulating mud stream flowing through the drill string 21 serves as a transmission medium that is well suited for transmitting acoustic signals to the surface at the speed of sound in the particular drilling fluid.

In accordance with the principles of the present invention, data-signaling means 24 are arranged on the tubular body 25 of the well tool 20 and include one or more condition-responsive devices, as at 26 and 27, coupled to appropriate electrical circuitry 28 operatively arranged in the tool body for sequentially producing digitally-coded electrical data signals that are representative of the measurements being obtained by the condition-responsive devices. It will, of course, be appreciated that these condition-responsive transducers 26 and 27 will be adapted as required for measuring such downhole measurements as the pressure, the temperature, or the resistivity or conductivity of either the drilling mud or adjacent earth formations as well as various other formation conditions or characteristics which are typically obtained by present-day wireline logging tools.

To provide electrical power for operation of the data-signaling means 24, a typical rotatively-driven generator 29 is coupled, as by a shaft 30, to an otherwise-typical reaction-type turbine impeller 31. As will be subsequently explained, the turbine impeller 31 is uniquely arranged to serve as one element of an acoustic signaler 32 which selectively interrupts or obstructs the drilling fluid flowing through the drill string 21 for producing digitally-encoded acoustic signals or pressure pulses at a corresponding pulse rate. Briefly stated, the signaler 32 is selectively operated in response to the data-encoded electrical signals from the downhole circuitry 28 as required for producing a correspondingly-encoded acoustic output signal as well as for continuously driving the generator 29 to supply the electrical power requirements of the data-transmission means 24. This encoded signal is successively transmitted to the surface through the mud stream flowing within the drill string 21 as a series of discrete signal portions or successive pressure pulses which, preferably, are encoded binary representations or data signals indicative of the downhole borehole or formation conditions respectively sensed by the condition-measuring devices 26 and 27. When these encoded signal pulses reach the surface, they are sequentially decoded and converted into meaningful data-conveying indications or records by suitable signal detecting-and-recording apparatus 33 such as that shown in U.S. Pat. No. 3,488,629 or U.S. Pat. No. 3,555,504 or U.S. Pat. No. 3,747,059, each of which is hereby incorporated herein by reference.

Figure 2B:
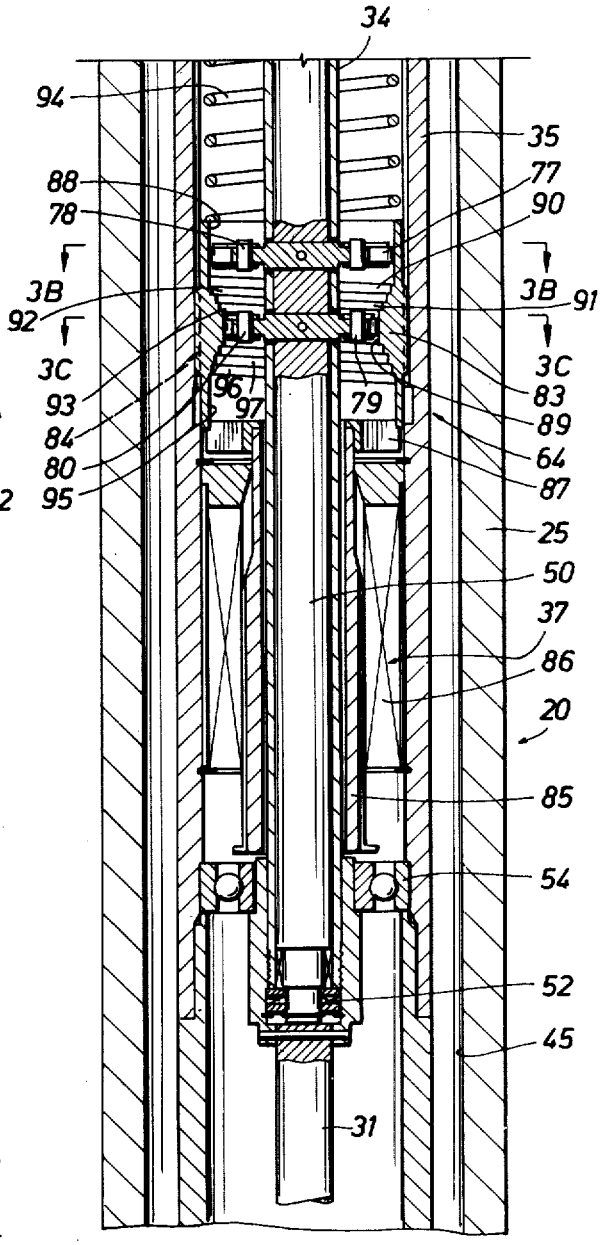

Turning now to FIGS. 2A and 2B, successive elevational views, in cross-section, are shown of the preferred embodiment of the acoustic signaler-generator driver 32 employed in the present invention. In general, this embodiment of the new and improved acoustic signaler 32 includes the reaction-type fluid-driven turbine 31 which is cooperatively coupled to the generator shaft 30 by an elongated tubular shaft 34 coaxially disposed within a tubular housing 35 that is, in turn, coaxially mounted within the tubular body 25 of the tool 20. As will be subsequently explained in further detail, the new and improved signaler 32 further includes selectively-operable fluid-obstructing means, such as an alternately-positionable obstructing member 36, cooperatively arranged for momentarily blocking or impeding the flow of drilling mud through the turbine 31 upon the controlled operation of actuating means, such as a typical solenoid actuator 37, in response to coded electrical signals from the encoder 28 (FIG. 1).

As best illustrated in FIGS. 2A and 3A, the turbine impeller 31 is typically arranged with a plurality of reaction passages, as at 38 and 39, having upwardly-facing inlet ports, as at 40 and 41, and appropriately-directed, laterally-facing outlet ports, as at 42 and 43. In this manner, as drilling mud is pumped downwardly through the tool body 25, the flowing mud will impart a rotative torque to the impeller 31 and the turbine shaft 34 as the mud leaves the laterally-directed discharge ports, as at 42 and 43, of the impeller.

To accommodate the flow of the drilling mud downstream of the signaler 32, the tubular housing 35 and the tool body 25 are cooperatively sized and shaped to define adequately-sized annular mud passages, as at 44 and 45, for conducting the mud on through the tool 20 and the drill bit 22 (FIG. 1). Similarly, to prevent at least significant bypassing of the turbine impeller 31, a tubular guard or mud shroud 46 is mounted on top of the rotatable impeller and extended upwardly as illustrated in FIG. 2A to a sliding and generally-sealing engagement with the underside of an inwardly-directed fixed shoulder 47 formed around the open upper end of the signaler housing 35. To minimize wear at that point, it is preferred to cooperatively mount opposed seal rings, as at 48 and 49, of a hardened material on the co-engaged surfaces of the shroud 46 and the shoulder 47 respectively. Accordingly, it will be appreciated that as drilling mud is pumped downwardly through the tool 20, it will be directed through the shroud 46; and, after being discharged from the turbine passages 38 and 39 to impart rotative torque to the impeller 31, the mud will flow on through the annular mud passages 44 and 45 in and around the housing 35.

It will, of course, be recognized by those skilled in the art that with any given drill string, as at 21, and a given flow rate of drilling mud, there will be a corresponding mud pressure at the surface end of the drill string. Moreover, it will be appreciated that an increased pressure will result if the flowing drilling mud is even partially obstructed; and the increase in this pressure differential will be directly related to the degree of obstruction.

Accordingly, in keeping with the principles of the present invention, the port-obstructing member 36 is cooperatively arranged on the upper face of the turbine impeller 31 for controlled rocking or arcuate movement between a non-obstructing position (as shown in FIG. 3A) where all of the inlet ports, as at 41, are at least substantially unblocked and a port-obstructing position (as shown in FIG. 5A) where one or more of the inlet ports are at least partially blocked. As depicted in the preferred embodiment of the acoustic signaler 32, it is preferred that the movable port-blocking member 36 be arranged for rotative movement in a relatively-short arc between a first operating position where all of the inlet ports, as at 41, are substantially uncovered and a second operating position where two of these ports are completely obstructed. It should, however, be understood that other arrangements of the port-blocking member 36 could be provided to either vary the number of affected ports or provide different degrees of non-obstruction or obstruction without departing from the broad conceptual scope of the present invention.

It will, of course, be recognized that the port-obstructing member 36 needs only to be shifted through a relatively-small arc of travel to accomplish its unique signal-producing function. Accordingly, an elongated shaft 50 is dependently secured to the port-obstructing member 36 and coaxially disposed inside of the tubular turbine shaft 34. To support the elongated shaft 50, one or more bearings, as at 51, are coaxially arranged within the turbine shaft 34 to facilitate the arcuate movement of the elongated shaft; and a thrust bearing, as at 52, is arranged on the turbine shaft for supporting the elongated shaft against the unbalanced axial forces imposed by the downwardly-flowing mud on the port-obstructing member 36.

Similarly, the turbine shaft 34 is rotatively-journalled within the signaler housing 35 as by one or more bearings 53 and 54 which support the turbine shaft 34 against unbalanced axially-directed forces. The enlarged upper portion 55 of the shaft is provided with an annular downwardly-facing shoulder 56 which is cooperatively and rotatably engaged with the upper face of an inwardly-directed shoulder 57 arranged around the intermediate portion of the stationary signaler housing 35. Hereagain, to provide a suitable fluid seal as well as to minimize the wear of these opposed shoulders 56 and 57, complementary annular inserts 58 and 59 of a hardened material are respectively arranged on the shoulders.

Those skilled in the art are, of course, well aware of the undesirable effects of drilling mud on closely-fitted machine parts. Accordingly, to isolate at least most of the interior of the signaler 32 from the drilling mud in the tool body 25, the enlarged upper portion 55 of the turbine shaft is cooperatively arranged to define an oil-filled reservoir 60 which is communicated with the interior of the signaler housing 35 below the housing shoulder 57 by way of the annular clearance gap between the shafts 34 and 50. To maintain the oil in the housing 35 at borehole pressure as well as to accommodate volumetric changes in the oil, an annular piston member 61 is coaxially arranged in the reservoir 60 and slidably sealed, as well as 62 and 63, with relation to the shafts 34 and 50. It will, of course, be appreciated that drilling mud will enter the upper portion of the reservoir 60 above the piston 61 so as to maintain the oil in the system at borehole pressure.

As previously mentioned, it is necessary only that the port-obstructing member 36 be capable of being angularly shifted or rocked through a relatively-small arc of travel which, in the depicted preferred embodiment of the signaler 32, is in the order of only about 30°. Accordingly, to selectively shift or rock the port-obstructing member 36 in an arcuate path between its two operating positions, shaft-positioning means, as shown generally at 64, are arranged between the shafts 34 and 50 and the housing 35 and cooperatively associated with the solenoid actuator 37. In the illustrated preferred embodiment of the signaler 32, the shaft-positioning means 64 include a first pair of radially-directed cam-supporting arms, as at 65 and 66, which, as best seen in FIG. 3B, are mounted on opposite sides of the elongated inner shaft 50 and respectively projected through a pair of circumferentially-oriented slots 67 and 68 formed on opposite sides of the tubular outer shaft 34. For reasons which will subsequently be explained, a second pair of similar or identical, oppositely-directed cam-supporting arms 69 and 70 (FIG. 3C) are arranged on the elongated inner shaft 50 and projected through a second opposed set of circumferentially-oriented slots 71 and 72 in the wall of the turbine shaft 34 a short distance below the outer slots 67 and 68.

The shaft-positioning means 64 further include first and second pairs of oppositely-directed cam-supporting arms, as at 73–76 in FIGS. 3B and 3C, which are secured on the exterior of the turbine shaft 34 between the respective ends of the several slots 67, 68, 71 and 72 and in circumferential alignment with the other cam-supporting arms 65, 66, 69 and 70 respectively. It should be noted that although the upper and lower slots, as at 67 and 68, are longitudinally aligned, the lower cam-supporting arms 75 and 76 are angularly offset in relation to the upper arms 73 and 74. Rotatable cam members 77–80 are respectively supported by an operative linkage arrangement between the outer ends of the cam-supporting arms 65, 66, 69, 70 and 73–76 so that radially-directed inward and outward movements of the cam members 77–80 will be effective for turning the elongated inner shaft 50 back and forth in relation to the outer turbine shaft 34 through an arc of travel corresponding to that required for selectively moving the port-obstructing member 36 between its two operating positions.

In the preferred embodiment of the signaler 32, this arcuate rocking movement of the elongated shaft is accomplished by rotatably journaling each cam member, as at 77, in an upright position between the outer ends of a pair of toggle links, as at 81 and 82, and pivotally coupling the inner end of the first link to the outer end of one of the cam-supporting arms, as at 73, on the turbine shaft 34 and pivotally coupling the inner end of the second link to the outer end of the adjacent cam-supporting arm, as at 65, on the inner shaft 50. Accordingly, it will be appreciated that by moving the cam rollers, as at 77 and 78, inwardly and outwardly between their outermost positions (as viewed in FIG. 3B) and their innermost positions (as viewed in FIG. 5B), the inner shaft 50 will be correspondingly rocked in relation to the outer shaft 34 between its respective angular positions.

Figure 4A:
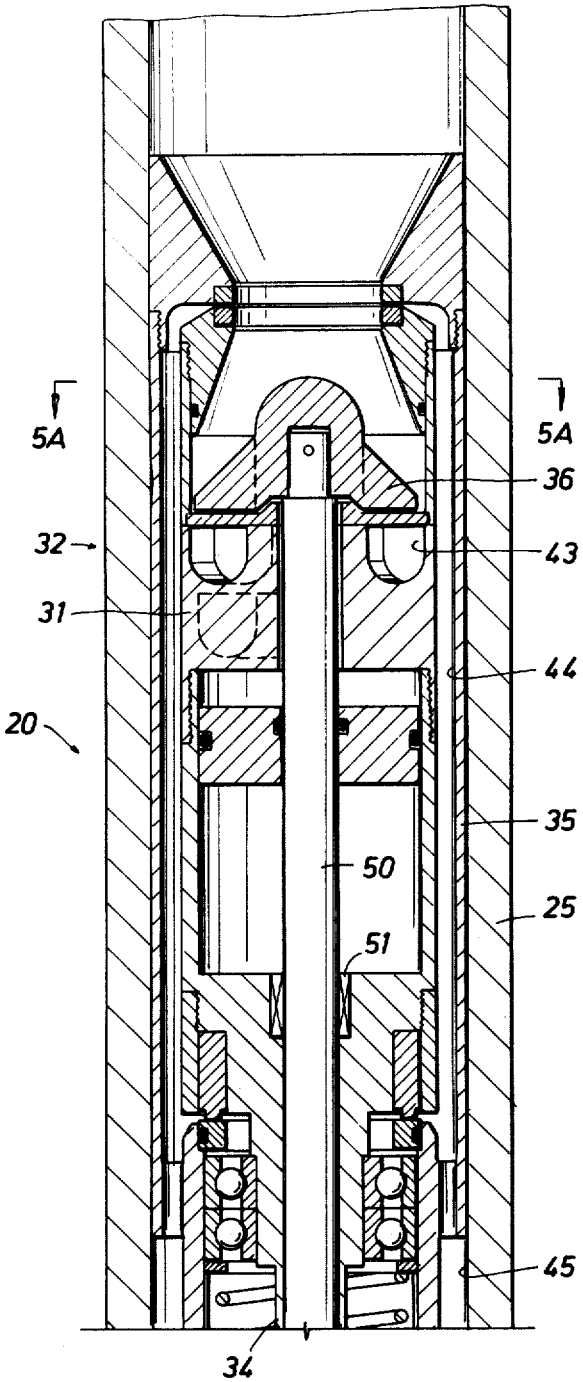
FIGS. 4A and 4B are views similar to those depicted in FIGS. 2A and 2B, but showing the new and improved acoustic signaler in a different operating position.
Figure 4B:
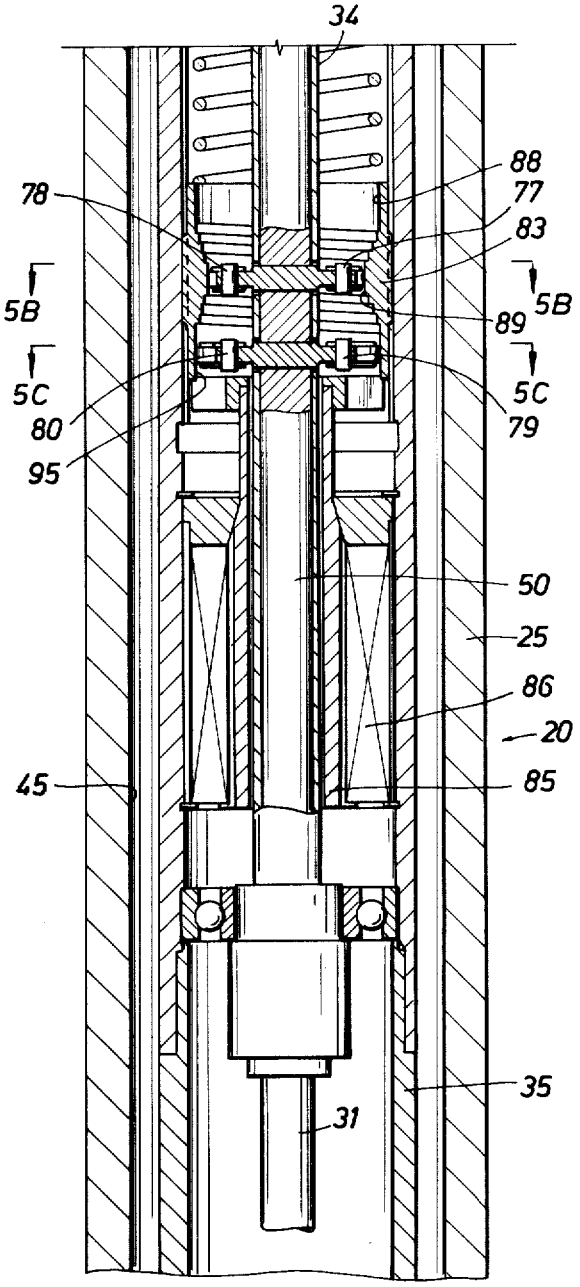

From the preceding discussion, it will be recognized, therefore, that the positioning of the port-obstructing member 36 is dependent upon the radial positions of the cam rollers, as at 77 and 78. Accordingly, to control the radial positioning of the several cam rollers 77–80, a tubular cam follower 83 is coaxially disposed within the housing 35 and adapted for limited longitudinal movement therein between a lower operating position as illustrated in FIG. 2B and an upper operating position as illustrated in FIG. 4B. By means, such as a longitudinal spline-and-groove arrangement 84, the cam follower 83 is prevented from rotating relative to the housing 35. To selectively shift the cam follower 83 between its upper and lower operating positions, the solenoid actuator 37 is provided with a longitudinally-reciprocating tubular plunger 85 which is coaxially disposed around the shafts 34 and 50 within an annular solenoid coil 86 and coupled to the cam follower as by a transversely-oriented spider 87.

It should be recognized that so long as mud is being pumped through the tool 20, the turbine impeller 31 will be rotating the turbine shaft 34 so as to continuously drive the generator 29 (FIG. 1). Similarly, in either operating position of the port-obstructing member 36, the elongated shaft 50 will also be rotating by virtue of the engagement of the cam-supporting arms, as at 65, against one or the other ends of the elongated slots, as at 67. Accordingly, throughout the operation of the new and improved tool 20, the several cam rollers 77–80 will also be rotating in their respective coaxial orbits about the longitudinal axis of the tool. It should also be noted that when the elongated shaft 50 is in the angular position relative to the turbine shaft 34 depicted in FIGS. 3A–3C, the upper cam rollers 77 and 78 will be rotating in their maximum-diameter orbit and the lower cam rollers 79 and 80 will be rotating in their minimum-diameter orbit. Conversely, when the elongated shaft 50 is in its other angular position with respect to the turbine shaft 34, the upper cam rollers 77 and 78 will now be in their minimum-diameter orbit and the lower cam rollers 79 and 80 will be in their maximum-diameter orbit as shown in FIGS. 5A–5C.

Accordingly, it will be recognized that the internal bore of the tubular cam follower 83 must be cooperatively arranged to progressively move each associated pair of the orbiting cam rollers 77–80 inwardly and outwardly as the cam follower is selectively shifted between its upper and lower operating positions. To understand the cooperative operation of the shaft-positioning means 64, it is believed best to first consider the action of only of the cam rollers, as at 77. First of all, as best illustrated in FIGS. 2B and 3B, the cam roller 77 is depicted there as being in its maximum-diameter orbit. As a result, the immediately-adjacent internal surface, as at 88, of the cam follower 83 must be of a corresponding and uniform diameter that will allow the cam roller 77 to roll smoothly around this surface through a full circle. On the other hand, after the cam follower 83 has been shifted upwardly (by energization of the solenoid actuator 37) to its elevated operating position shown in FIG. 4B, the cam roller 77 will now be rotating in its minimum-diameter orbit and the adjacent internal surface, as at 89, of the cam follower must have a correspondingly-reduced uniform diameter as shown in FIG. 5B. It will, of course, be recognized that both the maximum-diameter cam-guiding surface 88 and the minimum-diameter cam-guiding surface 89 must be coaxially distributed around the longitudinal axis of the tool 20.

It will, therefore, be appreciated that since the cam roller 77 is continuously rotating within the non-rotating cam follower 83, the cam roller must follow a spiraling path as it progressively moves between the upper and lower cam-guiding surfaces 88 and 89 upon shifting of the cam follower to one or the other of its operating positions. Accordingly, a suitably-configured spiraling path or cam-guiding surface, as at 90 and 91, is appropriately formed along the internal surface of the cam follower 83 between the upper and lower uniform-diameter cam-guiding surfaces 88 and 89. Thus, for example, upon energization of the solenoid actuator 37, as the cam follower 83 is shifted upwardly from its lower position to its upper operating position, the cam roller 77 will be continuously rotated through a steadily-reducing spiraling orbit as it progressively moves from the large-diameter surface 88, along the spiraling guide surfaces 90 and 91, and onto the intermediate reduced-diameter cam-guiding surface 89.

Although only the cam roller 77 and its associated supporting elements are essential for accomplishing the objects of the present invention, it has been recognized that more-reliable or stable operation can be achieved by providing the second oppositely-directed cam roller 78 to work in conjunction with the first roller. However, it will be appreciated that since the upper cam rollers will always be rotating in precisely the same orbit, the cam roller 78 cannot be rolled along the same spiral path, as at 90 and 91, that the cam roller 77 is rolling over since the rollers are on opposite sides of the shafts 34 and 50. Accordingly, to accommodate the cam roller 78, a second spiraling path or cam-guiding surface, as at 92 and 93, is formed along the internal bore of the cam follower 83 between the enlarged-diameter and reduced-diameter surfaces 88 and 89. This second spiraling path is simply oriented 180° out of phase with the first spiraling path so that at any given longitudinal position of the cam follower 83, there will be an equal distance or radius between the longitudinal axis of the tool 20 and the diametrically-opposite points on the first and second spiraling paths.

It will be appreciated, therefore, that upon upward shifting of the cam follower 83 by energization of the solenoid actuator 37, the upward travel of the cam follower will be effective for positively retracting the opposed cam rollers 77 and 78 as they respectively roll along their associated cam-guiding paths, as at 90 and 92, to the reduced-diameter cam-guiding surface 89. This action will, of course, serve to positively shift the port-blocking member 36 from its non-obstructing position shown in FIG. 3A to its port-obstructing position shown in FIG. 5A.

On the other hand, upon return of the solenoid plunger 85 to pull the cam follower 83 back to its lower operating position (along with the assistance of a cam-follower spring 94 normally biasing the cam follower toward that position) the opposed cam rollers 77 and 78 will not be positively returned to their respective extended positions. Accordingly, should there be unwanted restraint of the relative angular movement between the shafts 34 and 50, the signaler 32 could become inoperative. Therefore, to assure positive angular shifting of the inner shaft 50 in relation to the outer shaft 34 upon retraction of the cam follower 83, the lower half of the cam follower is shaped exactly like the upper half and faced in the opposite direction. Thus, as depicted in FIG. 2B, the cam follower 83 is provided with a lower, enlarged-diameter cam-guiding surface 95 which is of the same diameter as its counterpart surface 88. Similarly, separate intertwined and spiraling cam-guiding surfaces, as at 96 and 97, are provided within the lower half of the cam follower 83 for selectively guiding the cam rollers 79 and 80 between the uniform-diameter guiding surfaces 89 and 95.

It will be appreciated, therefore, that upon downward movement of the cam follower 83, the lower cam rollers 79 will be positively retracted as they are progressively moved inwardly by the ever-decreasing diameters of their respective spiraling guide surfaces 96 and 97. This positive action will, of course, assure angular repositioning of the inner shaft 50 and the port-obstructing member 36 as well as serve to return the upper cam rollers 77 and 78 to their respective extended positions. Thus, in the depicted preferred embodiment of the signaler 32, upon upward shifting of the cam follower 83, it is the upper cam rollers 77 and 78 that positively shift the port-obstructing member 36 to its port-obstructing position shown in FIG. 5A. Conversely, upon return of the cam follower 83 to its lower operating position by de-energization of the solenoid actuator 37, it is the lower cam rollers 79 and 78 which positively return the port-obstructing member 36 to its port-unblocking position shown in FIG. 3A.

Accordingly, it will be recognized that the selective operation of the solenoid actuator 37 by the encoder 29 (FIG. 1) will be effective for correspondingly producing data-encoded pressure pulses in the mud stream flowing through the new and improved tool 20 of the present invention. With the port-obstructing member 36 in its port-opening position depicted in FIG. 3a, the flowing stream of drilling mud is uniformly divided between the several fluid passages, as at 38 and 39, in the turbine impeller 31 for continuously driving the generator 29 (FIG. 1). The pressure at the surface end of the drill string 21 will be at a relatively-reduced level corresponding to the flow conditions at that moment.

Energization of the solenoid actuator 37 by the data encoder 28 will, however, be effective for angularly repositioning the port-obstructing member 36 to its port-blocking position as depicted in FIG. 5A. When this occurs, the entire mud stream will be diverted through the two remaining unblocked ports, as at 40. Thus, since the overall flow at this point in the new and improved tool 20 is thereby reduced to about half of its maximum-available area, there will be a corresponding detectable increase in the pressure of the flowing mud at the surface end of the drill string 21 (FIG. 1) so long as the flow of drilling mud is partially obstructed. This change in pressure will, of course, be detected and recorded on the surface apparatus 33. It will, of course, be recognized that the turbine impeller 31 will continue to rotate and the generator 29 will continue to provide power to the new and improved tool 20. Experience has shown that a massive flywheel (not shown) on the generator shaft 30 will effectively smooth out any voltage fluctuations which might occur under even widely-varying flow conditions.

Figure 6:
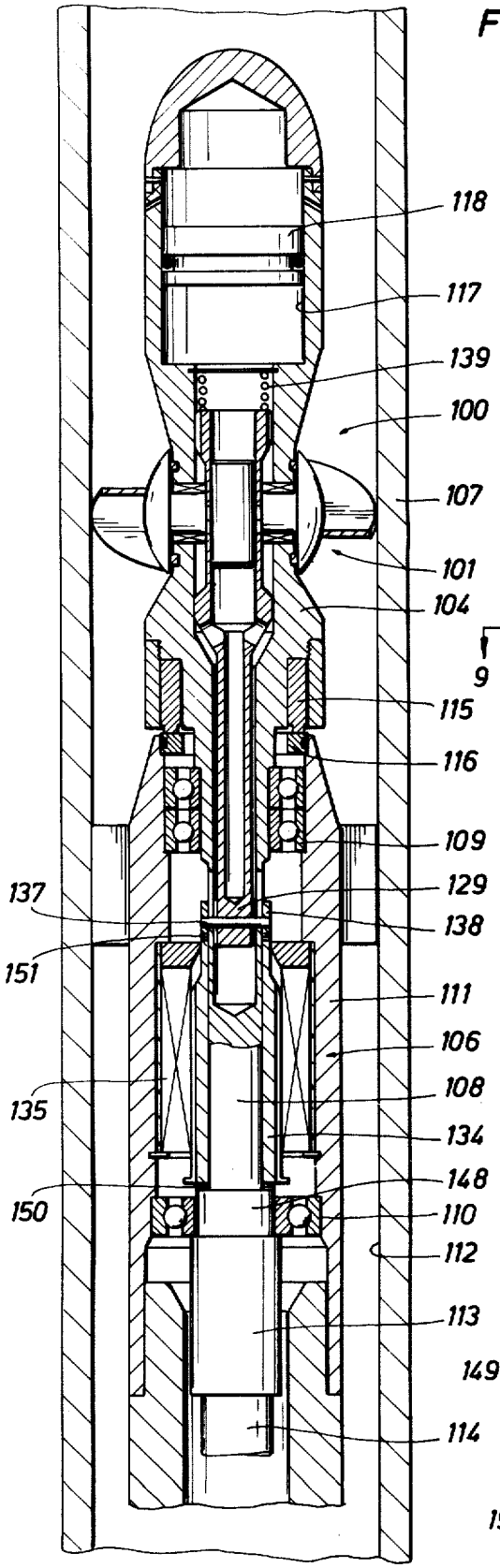
FIGS. 6 and 7 are enlarged cross-sectioned views of an alternative embodiment of a new and improved selectively-operable acoustic signaler which can also be employed with the well tool shown in FIG. 1, with FIG. 7 being drawn to a larger scale to better illustrate this alternative embodiment.
Figure 7:
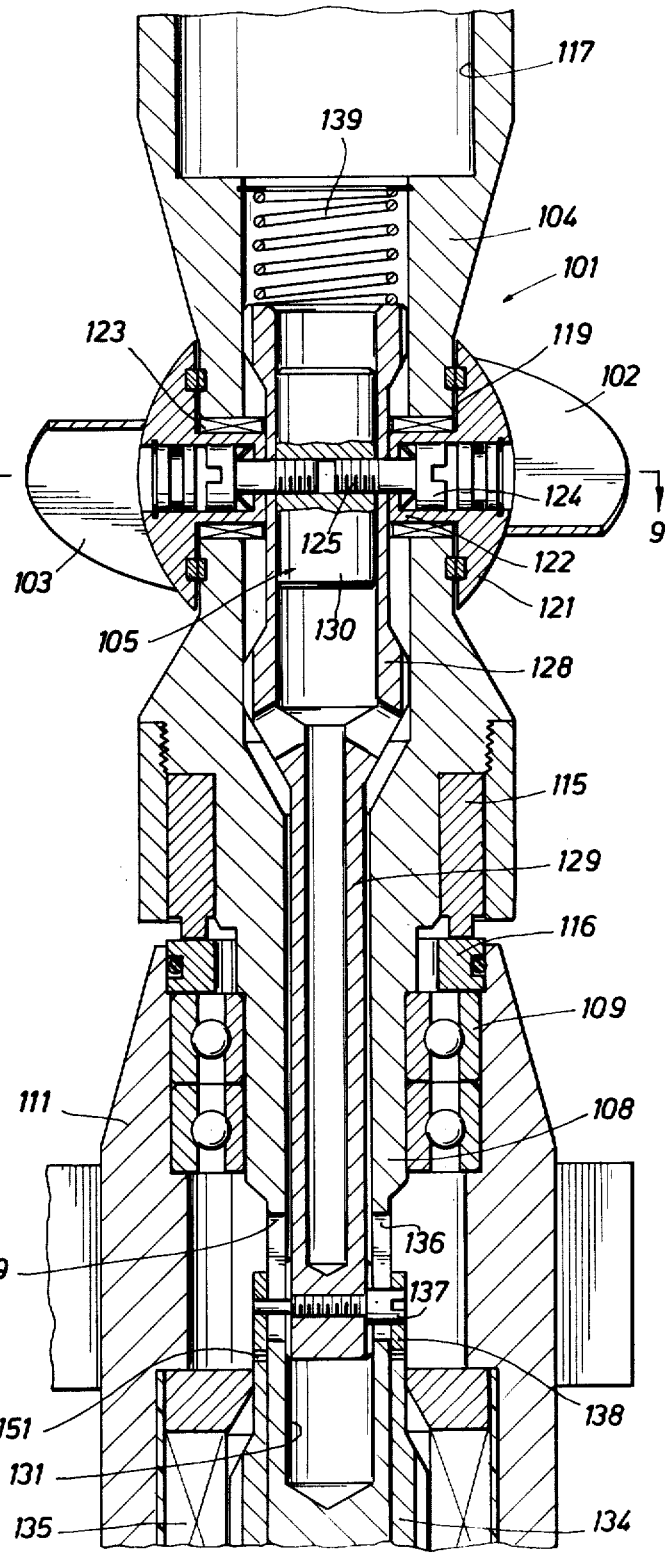

Turning now to FIGS. 6 and 7, an alternative embodiment is shown of a new and improved acoustic signaler 100 which also incorporates the principles of the present invention, with FIG. 7 being significantly enlarged in order to better illustrate certain preferred constructional details. It will, of course, be recognized that the alternative signaler 100 can be substituted for the signaler 32 previously described with reference to the tool 20. In general, the new and improved signaler 100 employs a multi-bladed impeller 101 having a number of radially-projecting blades, as at 102 and 103, which are each rotatably journalled around an enlarged hub 104 and cooperatively arranged for simultaneous movement about their respective axis between selected pitch angles. To accomplish the selective pitch adjustment of the multi-bladed impeller 101, blade-positioning means, as shown generally at 105, are arranged within the enlarged hub 104 and cooperatively coupled to a solenoid actuator 106 which is respectively operated by encoded electrical data signals such as those supplied by the encoder 28 (FIG. 1).

As illustrated in FIG. 6, the new and improved signaler 100 is coaxially mounted within a tubular tool body 107 (which is, of course, similar or idential to the body 25 of the tool 20) with the multi-bladed impeller 101 facing the downflowing mud stream. The enlarged hub 104 is mounted on the upper end of an elongated shaft 108 which is coaxially journalled, as by one or more bearings 109 and 110, within a tubular housing 111 that is coaxially mounted within the tool body 107 so as to define an annular passage 112 to conduct the drilling mud on to a drill bit (not shown) dependently coupled to the lower end of the tool body. The lower end of the elongated shaft 108 is cooperatively coupled, as at 113, to the upper end of the shaft 114 of a generator (not shown) mounted a short distance therebelow in the housing 107.

To provide a suitable fluid seal around the upper end of the elongated shaft 108, annular inserts 115 and 116 of a hardened material are respectively mounted coaxially around the lower face of the hub 104 and the upper end of the housing 111. Unbalanced axial loads which are imposed on the multi-bladed impeller 101 are carried by the bearing 109. For the same reasons as previously discussed in relation to the signaler 32, the upper portion of the elongated hub 104 is appropriately shaped to define an oil reservoir 117 which has a floating piston 118 disposed therein for maintaining the oil-filled housing 111 at borehole pressure as well as for accommodating volumetric changes of the oil in the system.

As best seen in FIGS. 7–9, each of the impeller blades, such as at 102, is pivotally mounted on the enlarged hub 104 and adapted for rotation about the longitudinal axis of the blade. In the preferred manner of accomplishing this, the central portion of the hub 104 is shaped to define flat outwardly-facing surfaces, as at 119 and 120, which (with four impeller blades) are uniformly distributed at intervals of 90° around the hub. Each impeller blade, as at 102 is formed with an enlarged, generally-hemispherical base, as at 121, adapted for sliding movement on its associated flat, as at 119, of the hub 104 and an inwardly-projecting tubular shank, as at 122. As best seen in FIG. 9, each of these shanks, as at 122, is journalled in the hub, as by a bearing 123, and cooperatively coupled to the hub by a bolt, as at 124, having its enlarged head captured in the shank. The threaded portion of each bolt, as at 125, is in turn passed through elongated openings, as at 126 and 127, in the sides of the enlarged upper end 128 of an elongated tubular rod 129 and threadedly coupled to a cylindrical support block 130 that is slidably disposed within the enlarged rod end. The tubular rod 128 is itself coaxially disposed for sliding longitudinal movement within an elongated counterbore 131 formed in the upper portion of the impeller shaft 108. Friction between the heads of the bolts, as at 124, and the blade shanks, as at 122, is minimized by a Bellville washer, as at 132. It will also be noted that the outer ends of the hollow shanks, as at 122, are fluidly sealed, as at 133, so that oil in the interior of the impeller shaft 108 will lubricate the heads of the bolts and the bearings, as at 124.

Accordingly, it will be recognized that by virtue of the bearings, as at 123, the several impeller blades, as at 102 and 103, are each rotatable about a radially-oriented lateral axis and that the bolts, as at 124, simply act as axles as well as serve to retain the blades on the hub 104. Thus, each of the impeller blades, as at 102 and 103, is capable of free rotation about its own radial axis as necessary when the pitch angles of the blades are to be changed.

To provide selective adjustment of the minimum and maximum pitch angles of the several impeller blades, as at 102 and 103, the elongated tubular rod 129 is extended on through the counterbore 131 in the impeller shaft 108 and cooperatively engaged with a longitudinally-reciprocating tubular plunger 134 that is coaxially disposed around the lower portion of the impeller shaft and operatively positioned within the annular solenoid coil 135 of the solenoid actuator 106. To couple the plunger 134 to the tubular operating rod 129, elongated openings, as at 136, are formed in the sides of the impeller shaft 108 and a transverse pin or screw 137 is connected between the lower end of the rod and a collar 138 slidably mounted around the impeller shaft just above the upper end of the plunger. A compression spring 139 is cooperatively engaged with the upper end of the elongated rod 129 for biasing the slidable collar 138 downwardly into engagement with the upper end of the solenoid plunger 134. This arrangement will, of course, be effective for transferring the reciprocating movements of the solenoid plunger 134 to the elongated operating rod 129.

As best seen in FIG. 8, the pitch angles of the several impeller blades, as at 102, are preferably controlled by cooperatively arranging camming means such as eccentrically-positioned lugs, as at 140, on the inner ends of the shanks, as at 122, which are respectively positioned in the elongated openings, as at 126 and 127, on the enlarged head 128 of the operating rod 129. It will be appreciated that since the openings, as at 126 and 127, are sized and laterally offset to accommodate both the bolt, as at 125, carrying a blade, as at 102, as well as the lug, as at 140, on the shank 122 of that blade, longitudinal movement of the operating rod 129 will be effective for selectively engaging either the upper edge 141 cr the lower edge 142 of each opening with the sides of each of the eccentric lugs. Thus, as viewed in FIG. 8, upward travel of the operating rod 129 will be effective for simultaneously turning the several impeller blades, as at 102, in a counter-clockwise direction (as shown by the arrow 143); and downward travel of the operating rod will simultaneously turn the four blades in the opposite direction (as shown by the arrow 144).

It will, of course, be appreciated that to accomplish the objects of the present invention, two factors are involved in the selective positioning of the impeller blades, as at 102 and 103. First of all, the impeller blades, as at 102 and 103, must always be pitched for producing sufficient torque to effectively drive the generator, as at 29, of the new and improved tool 100. Secondly, to produce detectable data-encoded pressure signals at the surface, the impeller blades, as at 102 and 103, must be selectively arranged so that in one operating position of the solenoid actuator 106, there will be a significantly-increased obstruction to the flowing drilling mud in comparison to the flow obstruction at the other operating position of the solenoid actuator.

It will be recognized that if the impeller blades, as at 102 and 103, were successively turned from a 0° pitch angle (i.e., where the surfaces of the blades are generally parallel to the flow of mud) to a 90° pitch angle (i.e., where the blades are turned to present a maximum obstruction to the flow of mud), the torque developed by the impeller 101 would progressively vary as graphically illustrated at 145 in FIG. 10. Thus, maximum torque output of the impeller 101 will ordinarily occur at or near a pitch angle of 45°. On the other hand, as graphically shown at 146 in FIG. 10, the pressure drop across the multi-bladed impeller 101 will progressively rise in a geometrical relationship as the several impeller blades, as at 102 and 103, are successively turned in unison from a 0° pitch angle to a 90° pitch angle. It will, therefore, be recognized that by alternatively positioning the several turbine blades, as at 102 and 103, at two widely-divergent pitch angles, $\Theta_1$ and $\Theta_2$, the differential, as at 147, in flow obstruction between the two pitch angles will be sufficiently great for producing a detectable change in pressure or an encoded pressure signal at the surface end of the drill string, as at 21 in FIG. 1.

As indicated in FIG. 10, in the preferred manner of practicing the present invention, it is believed best to select the two pitch angles, $\Theta_1$ and $\Theta_2$, to respectively be somewhat less and somewhat greater than 45° so that the torque developed by the impeller 101 will be substantially uniform at each of these two blade settings. At these two pitch angles $\Theta_1$ and $\Theta_2$, the differential 147 between the corresponding pressure drops at each of these pitch angles will be selected as required for producing encoded pressure pulses of a desired magnitude at the surface.

Referring again to FIGS. 6 and 7, it will, of course, be appreciated that the overall maximum travel of the solenoid plunger 134 and the operating rod 129 will be determined by the longitudinal distance between an upwardly-facing shoulder 148 on the impeller shaft 108 just below the plunger and a downwardly-facing shoulder 149 as defined by the upper edges of the lateral openings, as at 136, in the impeller shaft. Moreover, it will be recognized that the span of longitudinal travel as determined by the spacing between those two shoulders 148 and 149 will be directly related to the overall change in the pitch angle that will be attained as the solenoid plunger 134 moves between its upper and lower operating positions. Similarly, it will be recognized that the actual minimum pitch angle, as at $\Theta_1$, will be determined by the actual non-energized position of the solenoid plunger 134 and that the actual maximum pitch angle, as at $\Theta_2$, will be determined by the actual energized position of the solenoid plunger.

Accordingly, to provide sufficient latitude for selectively establishing the overall pressure differential between the maximum and minimum pitch angles of the impeller 101 as well as for pre-setting the actual pitch angle at each end of this differential scale, the new and improved signaler 100 is arranged so that one or more selected stop members or sets of shims, as at 150 and 151, can be respectively mounted on the signaler. For example, one or more shims, as at 150, can be mounted on the impeller shaft 108 on top of the shoulder 148 for selectively increasing the lower pitch angle as well as reducing the overall differential between the lower and upper pitch angles, $\Theta_1$ and $\Theta_2$, of the impeller 101. Similarly, one or more shims, as at 151, can be coaxially mounted on the impeller shaft 108 between the collar 138 and the upper end of the solenoid plunger 134 for reducing the maximum-available upper pitch angle as well as reducing the overall differential between the pitch angles $\Theta_1$ and $\Theta_2$. Thus, it will be recognized that the new and improved signaler 100 can be pre-adjusted at the surface to establish both the amplitude of its output pressure signals as well as the torque output for driving an electrical generator, as at 29, in the previously-discussed tool 20.

In the practice of the present invention, it will, of course, be recognized that with either the signaler 32 or the signaler 100, the down-flowing mud stream will be effective for continuously driving the electrical generator, as at 29, in FIG. 1; and, as either of these signalers is operated, the mud stream will be selectively obstructed in accordance with successive changes in the one or more downhole conditions measured by the measuring devices 26 and 27 for producing corresponding data-encoded pressure signals in the mud stream. These signals are, of course, respectively detected and decoded at the surface by the equipment 33.

It should be appreciated that with the preferred embodiment of the signaler 32, the mud stream is alternately divided into either two or four individual streams depending upon the angular position of the port-obstructing member 36. This alternate division of the mud streams will, of course, determine whether or not the overall mud flow is being substantially obstructed; and by selectively controlling the degree of this flow obstruction in accordance with the downhole conditions or formation characteristics being measured by the measuring devices 26 and 27, corresponding encoded pressure signals will be produced in the flowing mud stream without significantly impairing the continued generation of sufficient electrical power for the downhole electrical components in the tool 20.

In a similar fashion, the operation of the alternative embodiment of the apparatus of the present invention as exemplified by the signaler 100 will result in the mud stream always being divided into four streams (assuming, of course, the use of the depicted four-bladed impeller 101), with each of these four streams being simultaneously obstructed further as the solenoid actuator 106 is operated. Thus, hereagain, a data-encoded pressure signal will be produced in the flowing mud stream in accordance with the one or more borehole conditions for formation properties being measured by the one or more measuring devices, as at 26 and 27, included with the tool 20. There is, of course, no reduction in the power-generating capacity of the signaler 100 as these signals are produced.

Accordingly, it will be appreciated that the present invention has provided new and improved apparatus for reliably producing coded acoustic signals which are representative of one or more measured borehole or formation characteristics while simultaneously providing sufficient downhole electrical power. In contrast to the prior-art, the new and improved apparatus of the present invention have also uniquely reduced the overall power requirements of the downhole components of the signal transmission system by a significant amount since, for example, these new and improved tools do not require a motor for driving a downhole signaler. It should also be recognized that the principles of the present invention are not limited to so-called "measuring-while-drilling" applications. Thus, it should be understood that either of the two disclosed embodiments of the invention could alternatively be installed in a stationary pipe string such as a string of production tubing for transmitting signals representative of one or more downhole conditions by way of the up-flowing connate fluids.

While only particular embodiments of the present invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. Apparatus adapted for producing signals at the surface representative of at least one downhole condition occurring while drilling a borehole and comprising:

a body adapted to be tandemly coupled into a tubular drill string and defining a fluid passage for carrying drilling fluids being circulated to a borehole-drilling device dependently coupled therebelow;

data-signaling means on said body and including circuit means for producing digitally-encoded electrical data signals;

power-supply means on said body and including an electrical generator adapted to be rotatively driven for producing electrical power for said circuit means; *and* impeller means coupled to said generator and cooperatively arranged in fluid passage for rotatively driving said generator upon flow of drilling fluids through said fluid passage and said impeller means; [and] *said impeller means including* signal-producing means [cooperatively arranged on said impeller means and] adapted for *at least* partially obstructing the flow of drilling fluids through said [impeller means] *fluid passage* in response to said electrical data signals to selectively produce correspondingly-encoded acoustic signals in drilling fluids circulating through said body.

2. The apparatus of claim 1 further including:

condition-responsive measuring means on said body and coupled to said circuit means for supplying input signals thereto representative of at least one measured downhole condition during the drilling of a borehole.

3. The apparatus of claim 1 further including:

condition-responsive measuring means on said body and coupled to said circuit means for supplying input signals thereto representative of at least one measured formation characteristic during the drilling of a borehole.

4. The apparatus of claim 1 further including:

condition-responsive measuring means on said body and coupled to said circuit means for supplying input signals thereto representative of at least one measured characteristic of the drilling fluids circulating through a borehole exterior of said body during the drilling thereof.

5. The apparatus of claim 1 wherein said impeller means include a reaction-type turbine impeller having a plurality of flow passages cooperatively arranged therein for rotatively driving said impeller; and said signal-producing means include a passage-obstructing member cooperatively mounted on said impeller for movement between one operating position where flow of drilling fluids through at least one of said flow passages is at least substantially blocked and another operating position where flow of drilling fluids through said flow passages is at least substantially unimpeded, and actuating means cooperatively arranged for selectively moving said passage-obstructing member between its said operating positions in response to said electrical data signals.

6. The apparatus of claim 5 further including:

condition-responsive measuring means on said body and coupled to said circuit means for supplying input signals thereto representative of at least one measured downhole condition during the drilling of a borehole to correspondingly move said passage-obstructing member between its said operating positions and produce said encoded acoustic signals.

7. The apparatus of claim 5 further including:

condition-responsive measuring means on said body and coupled to said circuit means for supplying input signals thereto representative of at least one measured formation characteristic during the drilling of a borehole to correspondingly move said passage-obstructing member between its said operating positions and produce said encoded acoustic signals.

8. The apparatus of claim 5 further including:

condition-responsive measuring means on said body and coupled to said circuit means for supplying input signals thereto representative of at least one measured characteristic of the drilling fluids circulating through a borehole exterior of said body during the drilling thereof to correspondingly move said passage-obstructing member between its said operating positions and produce said encoded acoustic signals.

9. The apparatus of claim 1 wherein said impeller means include a multi-bladed impeller having a plurality of selectively-adjustable impeller blades cooperatively arranged for movement between selected pitch angles; and said signal-producing means include blade-positioning means cooperatively coupled to said impeller blades for movement between one operating position where said impeller blades are shifted to one pitch angle substantially blocking flow of drilling fluids through said fluid passage and another operating position where said impeller blades are shifted to another pitch angle substantially facilitating flow of drilling fluids through said fluid passage, and actuating means cooperatively arranged for selectively moving said blade-positioning means between said operating positions in response to said electrical data signals.

10. The apparatus of claim 9 further including:

condition-responsive measuring means on said body and coupled to said circuit means for supplying input signals thereto representative of at least one measured downhole condition during the drilling of a borehole to correspondingly move said blade-positioning means between said operating positions and produce said encoded acoustic signals.

11. The apparatus of claim 9 further including:

condition-responsive measuring means on said body and coupled to said circuit means for supplying input signals thereto representative of at least one measured formation characteristic during the drilling of a borehole to correspondingly move said blade-positioning means between said operating positions and produce said encoded acoustic signals.

12. The apparatus of claim 9 further including:

condition-responsive measuring means on said body and coupled to said circuit means for supplying input signals thereto representative of at least one measured characteristic of the drilling fluids circulating through a borehole exterior of said body during the drilling thereof to correspondingly move said blade-positioning means between said operating positions and produce said encoded acoustic signals.

13. Apparatus adapted for measuring at least one downhole condition while drilling a borehole and comprising:

a body tandemly coupled in a tubular drill string having a borehole-drilling device independently coupled thereto and defining a fluid passage for circulating drilling fluids between the surface and said borehole-drilling device;

data-signaling means on said body and adapted for providing digitally-encoded data signals representative of at least one downhole condition;

power-supply means on said body and including an electrical generator adapted to be rotatively driven for producing electrical power for said data-signaling means;

a multi-ported reaction-type turbine impeller coupled to said generator and cooperatively journalled in said fluid passage for rotatively driving said generator upon circulation of drilling fluids through the ports of said impeller;

signal-producing means including a port-obstructing member cooperatively mounted on said impeller for movement between one operating position where flow of drilling fluids through said impeller ports is at least substantially unimpeded and another operating position where flow of drilling fluids through at least one of said impeller ports is at least substantially blocked for producing a pressure pulse in drilling fluids circulating through said fluid passage, and actuating means coupled to said port-obstructing member and operable in response to said data signals for selectively moving said port-obstructing member between its said operating positions to produce corresponding digitally-encoded pressure pulses in drilling fluids circulating through said fluid passage; and pulse-detecting means cooperatively coupled to the surface end of said drill string for detecting said pressure pulses to provide indications at the surface representative of of said downhole condition.

14. The apparatus of claim 13 wherein said port-obstructing member is cooperatively arranged upstream of said impeller for blocking entrance of drilling fluids into said one impeller port upon movement of said port-obstructing member to its said other operating position.

15. The apparatus of claim 13 wherein said actuating means include an electro-mechanical actuator cooperatively arranged for moving said port-obstructing member between its said operating positions in response to electrical signals from said data-signaling means.

16. The apparatus of claim 15 wherein said data-signaling means include circuit means coupled to said actuator and cooperatively arranged for supplying digitally-encoded electrical output signals thereto, and condition-responsive means on said body and coupled to said circuit means for supplying electrical input signals thereto representative of said downhole condition.

17. The apparatus of claim 15 wherein said downhole condition is a selected formation characteristic and said data-signaling means include circuit means for supplying electrical input signals thereto representative of said formation characteristic.

18. The apparatus of claim 15 wherein said downhole condition is a selected characteristic of drilling fluids circulating through a borehole exterior of said body and said data-signaling means include circuit means for supplying electrical input signals thereto representative of said drilling fluid characteristic.

19. Apparatus adapted for measuring at least one downhole condition while drilling a borehole and comprising:

a body tandemly coupled in a tubular drill string having a borehole-drilling device dependently coupled thereto and defining a fluid passage for circulating drilling fluids between the surface and said borehole-drilling device;

data-signaling means on said body and adapted for providing digitally-encoded electrical data signals representative of at least one downhole condition;

power-supply means on said body and including an electrical generator adapted to be rotatively driven for producing electrical power for said data-signaling means;

a multi-bladed turbine impeller coupled to said generator and cooperatively journalled in said fluid passage for rotatively driving said generator upon circulation of drilling fluids through the openings between the blades of said impeller, said impeller blades being cooperatively arranged for movement between selected pitch angles;

signal-producing means including cam means cooperatively associated with said impeller blades for simultaneously shifting said impeller blades between one operative pitch angle where flow of drilling fluids through said impeller openings is at least substantially unimpeded and another operative pitch angle where flow of drilling fluids through said impeller openings is at least substantially impeded for producing a pressure pulse in drilling fluids circulating through said fluid passage, and actuating means coupled to said cam means and operable in response to said data signals for selectively moving said impeller blades between their said operative pitch angles to produce corresponding digitally-encoded pressure pulses in drilling fluids circulating through said fluid passage; and pulse-detecting means cooperatively coupled to the surface end of said drill string for detecting said pressure pulses to provide indications at the surface representative of said downhole condition.

20. The apparatus of claim 19 wherein said actuating means include an electro-mechanical actuator cooperatively arranged for moving said impeller blades between their said operative pitch angles in response to said electrical data signals from said data-signaling means.

21. The apparatus of claim 20 wherein said data-signaling means include circuit means coupled to said actuator and cooperatively arranged for supplying digitally-encoded electrical output signals thereto, and condition-responsive means on said body and coupled to said circuit means for supplying electrical input signals thereto representative of said downhole condition.

22. The apparatus of claim 20 wherein said downhole condition is a selected formation characteristic and said data-signaling means include circuit means for supplying electrical input signals thereto representative of said formation characteristic.

23. The apparatus of claim 20 wherein said downhole condition is a selected characteristic of drilling fluids circulating through a borehole exterior of said body and said data-signaling means include circuit means for supplying electrical input signals thereto representative of said drilling fluid characteristic.

24. Apparatus adapted for producing acoustic signals at the surface representative of at least one downhole condition and comprising:

a body having a fluid passage and adapted for mounting in a well bore pipe string carrying flowing fluids between the surface and a downhole location in a well bore;

data-signaling means on said body and cooperatively arranged for producing digitally-encoded electrical signals representative of at least one downhole condition;

power-supply means on said body and including an electrical generator adapted to be rotatively driven for supplying electrical power to said data-signaling means, and a multi-ported turbine impeller coupled to said generator and cooperatively arranged in said fluid passage for operatively driving said generator upon flow of fluids through the ports of said impeller; and signal-producing means including a member movably arranged on said impeller and selectively operable in response to said electrical signals for momentarily obstructing the flow of fluids through at least one of said impeller ports to produce correspondingly-encoded acoustic signals in such fluids.

25. The apparatus of claim 24 wherein said data-signaling means include:

circuit means cooperatively arranged for producing said electrical signals in response to input signals supplied thereto; and condition-measuring means coupled to said circuit means and cooperatively arranged for supplying input signals thereto representative of at least one formation characteristic.

26. The apparatus of claim 25 further including:

detecting means adapted for coupling to the surface end of a well bore pipe string carrying said body for detecting said acoustic signals to provide indications at the surface representative of said formation characteristic.

27. The apparatus of claim 24 wherein said data-signaling means include:

circuit means cooperatively arranged for producing said electrical signals in response to input signals supplied thereto; and condition-measuring means coupled to said circuit means and cooperatively arranged for supplying input signals thereto representative of at least one characteristic of such fluids.

28. The apparatus of claim 27 further including:

detecting means adapted for coupling to the surface end of a well bore pipe string carrying said body for detecting said acoustic signals to provide indications at the surface representative of said fluid characteristic.

29. Apparatus adapted for producing acoustic signals at the surface representative of at least one downhole condition and comprising:

a body having a fluid passage and adapted for mounting in a well bore pipe string carrying flowing fluids between the surface and a downhole location in a well bore;

data-signaling means on said body and cooperatively arranged for producing digitally-encoded electrical data signals representative of at least one downhole condition;

power-supply means on said body and including an electrical generator having a tubular driving shaft and adapted to be rotatively driven for supplying electrical power to said signaling means, and a multi-ported turbine impeller coupled to said driving shaft and cooperatively arranged in said fluid passage for operatively driving said generator upon flow of fluids through the ports of said impeller; and signal-producing means on said body and including a port-obstructing member cooperatively mounted on said impeller for angular movement relative thereto between one operating position where flow of fluids through said impeller ports is substantially unimpeded and another operating position where flow of fluids through at least one of said impeller ports is substantially obstructed, an actuating shaft coaxially disposed in said driving shaft and coupled to said port-obstructing member for moving said port-obstructing member between its said operating positions upon angular movement of said actuating shaft in relation to said driving shaft, a tubular cam follower coaxially disposed around said shafts and adapted for longitudinal movement in relation thereto between one cam-actuating position where an enlarged-diameter first internal bore portion of said cam follower is adjacent to a lateral opening in said tubular shaft and another cam-actuating position where a reduced-diameter second internal bore portion of said cam follower is adjacent to said shaft opening, a spiraling intermediate internal bore portion joining said first and second internal bore portions, an electro-mechanical actuator coupled to said data-signaling means and responsive to said electrical data signals for selectively shifting said cam follower between said cam-actuating positions, a rotatable cam adapted for rolling movement along said internal bore portions in first and second orbital paths around said shafts respectively determined by the diameters of said first and second internal bore portions, and linkage means cooperatively coupling said cam between said shafts for angularly moving said actuating shaft in relation to said tubular shaft and including a first linkage member secured to said tubular shaft to one side of said shaft opening and a second linkage member secured to said actuating shaft and disposed within said shaft opening for angular movement therein in accordance with radial movements of said cam between its said orbital paths.

30. The apparatus of claim 29 wherein said data-signaling means include:

circuit means cooperatively arranged for producing said electrical data signals in response to input signals supplied thereto; and condition-measuring means coupled to said circuit means and cooperatively arranged for supplying input signals thereto representative of at least one formation characteristic.

31. The apparatus of claim 30 further including:

detecting means adapted for coupling to the surface end of a well bore pipe string carrying said body for detecting said acoustic signals to provide indications at the surface representative of said formation characteristic.

32. The apparatus of claim 29 wherein said data-signaling means include:

circuit means cooperatively arranged for producing said electrical data signals in response to input signals supplied thereto; and condition-measuring means coupled to said circuit means and cooperatively arranged for supplying input signals thereto representative of at least one characteristic of such fluids.

33. The apparatus of claim 32 further including:

detecting means adapted for coupling to the surface end of a well bore pipe string carrying said body for detecting said acoustic signals to provide indications at the surface representative of said fluid characteristic.

*34. Apparatus adapted for producing acoustic signals for transmission to the surface representative of at least one downhole condition occurring while drilling a borehole, comprising:*

*a housing adapted to be positioned within a tubular body defining a fluid passage that conducts drilling fluids being circulated to a borehole-drilling device dependently coupled therebelow;*

*circuit means for producing encoded electrical signals representative of a downhole measurement;*

*power generating means in said housing and including an electrical generator adapted to be rotatively driven for producing electrical power for said circuit means; and*

*impeller means coupled to said generator and cooperatively arranged in said fluid passage for rotatively driving said generator upon flow of drilling fluids through said fluid passage, said impeller means including means responsive to said encoded electrical signals for at least partially obstructing the flow of drilling fluids through said passage to thereby produce correspondingly encoded acoustic signals in said drilling fluids.*

*35. The apparatus of claim 34 wherein said impeller means includes a reaction-type turbine impeller having a plurality of flow passages; and said obstructing means includes a passage-obstructing member mounted for movement between one operating position where flow of drilling fluids through at least one of said flow passages is at least substantially blocked and another operating position where flow of drilling fluids through said flow passages is at least substantially unimpeded.*

*36. The apparatus of claim 35 wherein said obstructing means further includes actuating means cooperatively arranged for selectively moving said passage obstructing member between its operating positions in response to said encoded electrical signals.*

*37. The apparatus of claim 34 wherein said impeller means includes a multi-bladed impeller having a plurality of selectively adjustable blades cooperatively arranged for movement between selected pitch angles; and said obstructing means includes blade-positioning means cooperatively arranged coupled to said blades for movement between one operating position where said blades are shifted to one pitch angle substantially blocking flow of drilling fluids through said fluid passage and another operating position where said blades are shifted to another pitch angle substantially facilitating flow of drilling fluids through said fluid passage.*

*38. The apparatus of claim 37 wherein said obstructing means further includes means cooperatively arranged for selectively moving said blade-positioning means between said operating positions in response to said encoded electrical signals.*

* * * * *